US006497019B1

(12) United States Patent
Yun

(10) Patent No.: US 6,497,019 B1
(45) Date of Patent: Dec. 24, 2002

(54) MANUFACTURING METHOD OF INK JET PRINTER HEAD

(75) Inventor: Sang Kyeong Yun, Kyungki-Do (KR)

(73) Assignee: Samsung Electronics Co., Ltd., Suwon (KR)

( * ) Notice: Subject to any disclaimer, the term of this patent is extended or adjusted under 35 U.S.C. 154(b) by 202 days.

(21) Appl. No.: 09/594,644

(22) Filed: Jun. 15, 2000

(30) Foreign Application Priority Data

Dec. 10, 1999 (KR) ........................................... 99-56399

(51) Int. Cl.[7] ................................................ G01D 15/20

(52) U.S. Cl. ....................... 29/25.35; 29/890.1; 216/27; 347/68; 430/326

(58) Field of Search ................................ 29/25.35, 846, 29/890.1; 310/365; 216/27, 41; 347/63, 65, 68, 70, 71, 72; 430/320, 323, 324, 326

(56) References Cited

U.S. PATENT DOCUMENTS 5,802,686 A * 9/1998 Shimada et al. .............. 216/27
6,334,244 B2 * 1/2002 Hashizume .................. 216/27

FOREIGN PATENT DOCUMENTS

| | | |
|---|---|---|
| JP | 5-155027 | 6/1993 |
| JP | 7-221443 | 8/1995 |
| JP | 7-309008 | 11/1995 |
| JP | 8-238759 | 9/1996 |
| JP | 9-272996 | 10/1997 |
| JP | 11-028820 | 2/1999 |
| JP | 11-227196 | 8/1999 |
| JP | 11-277754 | 10/1999 |

OTHER PUBLICATIONS

English Abstract of JP7221443 dated Aug. 18, 1995.
English Abstract of JP9272996 dated Oct. 21, 1997.
English Abstract of JP11227196 dated Aug. 24, 1999.
English Abstract of JP11277754 dated Oct. 12, 1999.
English Abstract of JP5155027 dated Jun. 22, 1993.
English Abstract of JP8238759 dated Sep. 17, 1996.
English Abstract of JP7309008 dated Nov. 28, 1995.
English Abstract of JP11028820 dated Feb. 2, 1999.

* cited by examiner

*Primary Examiner*—Timothy L. Maust
*Assistant Examiner*—Peter deVore
(74) *Attorney, Agent, or Firm*—Ladas & Parry

(57) ABSTRACT

A method for manufacturing an ink jet printer head is disclosed which the method comprises steps of providing a substrate; forming a crater layer by photolighography and plating under the substrate; forming a nozzle plate by photolighography and plating under the crater layer; forming a channel plate by photolighography and plating under the nozzle plate; forming a reserver plate by photolighography and plating under the channel plate; forming a restrictor plate by photolighography and plating under the reserver plate; forming a chamber plate by photolighography and plating under the restrictor plate; forming a vibration plate by plating under the chamber plate; removing the substrate; removing all photoresist remaining; forming a piezoelectric/electrostrictive film to actuate when electrified upon the vibration plate; and forming an upper electrode upon the piezoelectric/electrostrictive film.

76 Claims, 26 Drawing Sheets

MANUFACTURING METHOD OF INK JET PRINTER HEAD

BACKGROUND OF THE INVENTION

1. Field of the Invention

The present invention relates to a printer head and particularly to a manufacturing method of an ink jet printer head.

2. Description of the Prior Art

Ink jet printer head is generally formed by sequential accumulation of nozzle plate 222 where nozzle 223 has been formed, reserver plate 221 where reserver 220 is formed, channel plate 219 where flow channel 218 is formed, restrictor plate 217 where restrictor 216 is formed, chamber plate 215 forming a chamber 214, and actuator composed of three parts of upper electrode 210, piezoelectric substance 211 and lower electrode 212 as in FIG. 1.

Ink flowpath is formed in ink jet printer head by the above formation of such as nozzle 223, reserver 220, flow channel 218, restrictor 216, chamber 214 of mutually different sizes and shapes.

Ink supplied from ink canister (not shown in figure) is reserved in reserver 220 after which it flows into chamber 214 through flow channel 218 whence the reserver 220 formed between flow channel 218 and chamber 214 maintains ink flow speed into chamber 214 to a constant state.

Piezoelectric substance 211 is actuated if voltage is applied at upper electrode 210 and lower electrode 212 of actuator formed upon chamber 214; by which piezoelectric substance 211 actuation the chamber 214 volume momentarily decreases while chamber 214 ink is ejected through nozzle 223 formed at nozzle plate 222 onto material on which to be written. Printing is carried out by this ink jet.

Until now to manufacture an ink jet printer head as described above, use has been made of method of assembling after separately making a nozzle plate where nozzle is formed, a reserver plate where reserver is formed, a channel plate where channel is formed, a restrictor plate where restrictor is formed and a chamber plate where chamber is formed.

In this method, each plate comprising the ink jet printer head as above is manufactured by each separate process, and photoresist is coated on each of these separately manufactured plates which are then exposed to light, after which the guide holes are formed for assembling, by way of micro-patterning utilizing a micro-punching or a lithography process, then these plates are piled one upon another. Guide holes are fastened by screw etc. to fix the plates which are then thermally treated so that they are bonded together to finish the ink jet printer head.

In this traditional method, there is problem that yield percentage is low because there is large possibility to generate assembly tolerance error owing to inaccurate congruence of the guide hole positions and the plate sizes when assembling. And there is demerit of production cost rise because such photoresist should be used as is excellent in adhesion and low in reactivity with ink, which photoresist is to be coated before bonding the plates together.

SUMMARY OF THE INVENTION

Purpose of the present invention to solve the above problems is to provide a manufacturing method of ink jet printer head by forming the parts in a bundle using electrochemical process.

This invention to achieve the above purpose relates to a manufacturing method of an ink jet printer head comprising steps of providing a substrate; forming a first photoresist layer by coating photoresist in the thickness of a crater layer under the substrate; leaving the first photoresist only at crater part by patterning, exposing to light and etching the first photoresist layer; forming the crater layer under the substrate by plating process; forming a second photoresist layer by coating photoresist in the thickness of a nozzle plate under the crater layer; leaving the second photoresist only at nozzle part by patterning, exposing to light and etching the second photoresist layer; forming the nozzle plate under the crater layer by plating process; forming a third photoresist layer by coating photoresist in the thickness of a channel plate under the nozzle plate; leaving the third photoresist only at channel part by patterning, exposing to light and etching the third photoresist layer; forming the channel plate under the nozzle plate by plating process; forming a fourth photoresist layer by coating photoresist in the thickness of a reserver plate under the channel plate; leaving the fourth photoresist only at reserver part by patterning, exposing to light and etching the fourth photoresist layer; forming the reserver plate under the channel plate by plating process; forming a fifth photoresist layer by coating photoresist in the thickness of a restrictor plate under the reserver plate; leaving the fifth photoresist only at restrictor part by patterning, exposing and etching the fifth photoresist layer; forming the restrictor plate under the reserver plate by plating process; forming a sixth photoresist layer by coating photoresist in the thickness of a chamber plate under the restrictor plate; leaving the sixth photoresist only at chamber part by patterning, exposing and etching the sixth photoresist layer; forming the chamber plate under the restrictor plate by plating process; forming a vibration plate under the chamber plate by plating process; removing the substrate; removing all photoresist remaining; forming a piezoelectric/electrostrictive film to actuate when electrified upon the vibration plate; and forming an upper electrode upon the piezoelectric/electrostrictive film.

And this invention relates to a manufacturing method of an ink jet printer head comprising steps of providing a substrate made of piezoelectric/electrostrictive material; forming a vibration plate by plating under the substrate; forming a sixth photoresist layer by coating photoresist in the thickness of a chamber plate under the vibration plate; leaving the sixth photoresist only at chamber part by patterning, exposing and etching the sixth photoresist layer; forming the chamber plate by plating under the vibration plate; forming a fifth photoresist layer by coating photoresist in the thickness of a restrictor plate under the chamber plate; leaving the fifth photoresist only at restrictor part by patterning, exposing and etching the fifth photoresist layer; forming the restrictor plate by plating under the chamber plate; forming a fourth photoresist layer by coating photoresist in the thickness of a reserver plate under the restrictor plate; leaving the fourth photoresist only at reserver part by patterning, exposing to light and etching the fourth photoresist layer; forming the reserver plate by plating under the restrictor plate; forming a third photoresist layer by coating photoresist in the thickness of a channel plate under the reserver plate; leaving the third photoresist only at channel part by patterning, exposing to light and etching the third photoresist layer; forming the channel plate by plating under the reserver plate; forming a second photoresist layer by coating photoresist in the thickness of a nozzle plate under the channel plate; leaving the second photoresist only at nozzle part by patterning, exposing to light and etching the second photoresist layer; forming the nozzle plate by plating under the channel plate; forming a first photoresist layer by coating photoresist in the thickness of a crater layer under the nozzle plate; leaving the first photoresist only at crater part by patterning, exposing to light and etching the first photoresist layer; forming the crater layer by plating under the nozzle plate; removing all photoresist remaining; forming a piezoelectric/electrostrictive film by lapping, patterning and etching the substrate; and forming an upper electrode upon the piezoelectric/electrostrictive film.

DETAILED DESCRIPTION

Figure 1:
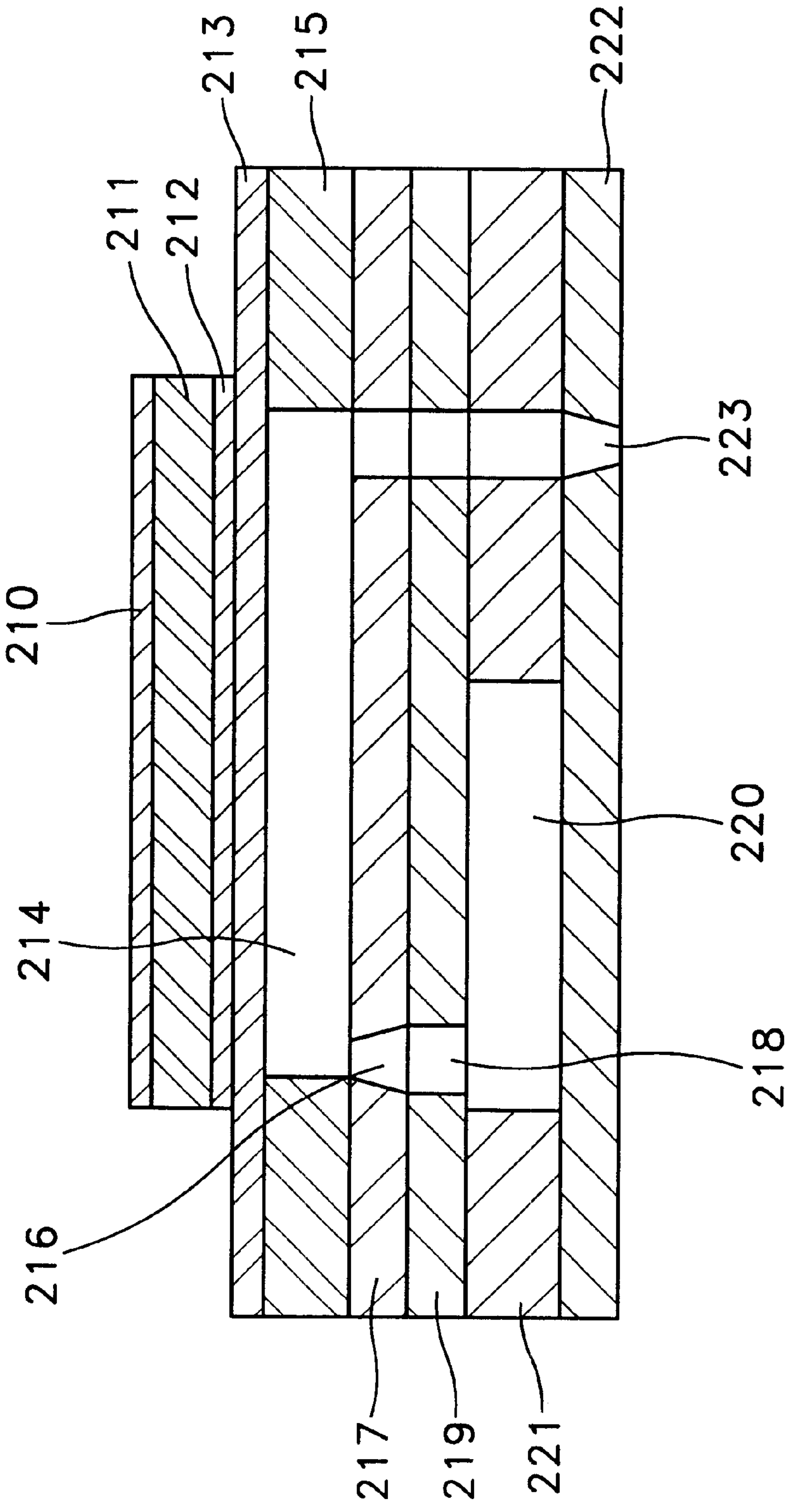
FIG. 1 is a cross section view of general ink jet printer heads.

Silicon (Si) wafer, metals such as stainless steel, polymeric compounds, or ceramic materials such as aluminium oxide ($Al_2O_3$), silicon dioxide ($SiO_2$) and PZT may be used for material of a substrate that is the base.

First photoresist is coated by the thickness of crater layer under the above substrate and then is exposed and etched so that part where crater is to be formed is shielded by the first photoresister.

Seeding layer must be formed under substrate in case where nonconductive ceramics, polymer or silicon wafer is used for substrate. The seeding layer may not be formed in case where metal is used for substrate but a separate seeding layer may be formed for plating to take place in stable condition. As for seeding layer, film is formed by evaporation or sputtering of conductive metal such as gold (Au) or nickel (Ni).

Crater layer is formed after shielding by first photoresister under metallic substrate or other substrate where seeding layer has been formed.

Second photoresist is coated by thickness of nozzle plate under formed crater layer and then is exposed and etched so that part where nozzle is to be formed is shielded by the second photoresister. Nozzle plate is formed under crater layer after shielding by second photoresister.

Third photoresist is coated by thickness of channel plate under formed nozzle plate and then is exposed and etched so that part where channel is to be formed is shielded by the third photoresister. Channel plate is formed under nozzle plate after shielding by third photoresister.

Fourth photoresist is coated by thickness of reserver plate under formed channel plate and then is exposed and etched so that part where reserver is to be formed is shielded by the fourth photoresister. Reserver is formed under channel plate after shielding by fourth photoresister.

Fifth photoresist is coated by thickness of restrictor plate under formed reserver plate and then is exposed and etched so that part where restrictor is to be formed is shielded by the fifth photoresister. Restrictor plate is formed under reserver plate after shielding by fifth photoresister.

Sixth photoresist is coated by thickness of chamber plate under formed restrictor plate and then is exposed and etched so that part where chamber is to be formed is shielded by the sixth photoresister. Chamber plate is formed under restrictor plate after shielding by sixth photoresister.

Vibration plate is formed under formed chamber plate.

Single metal, complex metal, ceramic or metal-ceramic complex may be selectively used for material of crater layer, nozzle plate, channel plate, reserver plate, restrictor plate, chamber plate and vibration plate. Single metal, complex metal, ceramic or metal-ceramic complex may be selectively used for vibration plate material. Nickel (Ni), copper (Cu) etc. are preferable in case of single metal. Alloy such as nickel-chromium (Ni—Cr) or nickel-cobalt-tungsten (Ni—Co—W) is preferable in case of complex metal. Silicon dioxide ($SiO_2$), silicon nitride ($Si_3N_4$), aluminium oxide ($Al_2O_3$), silicon carbide (SiC) etc. are preferable in case of ceramics. And nickel-ceramic mixture of nickel-aluminium oxide ($Ni—Al_2O_3$), nickel-silicon dioxide ($Ni—SiO_2$), nickel-titanium dioxide ($Ni—TiO_2$) etc. or of nickel-silicon carbide (Ni—SiC), nickel-titanium carbide (Ni—TiC), nickel-tungsten carbide (Ni—WC) etc. are preferable in case of metal-ceramic complex.

Whence adequate stuff material shall be selectively used considering ink jet printer head rigidity, reactivity of ink and ink jet printer head material, part material surface characteristics, external resistivity of corrosion resistance etc., because completed ink jet printer head characteristics may vary according to property of stuff material used at this manufacturing time.

Particularly it is preferable to use metal-ceramic complex in case of vibration plate because this kind of materials is highly rigid and so has excellent frequency characteristics so that crosstalk according to high scale integration of ink jet printer head may be prevented.

Crater layer, nozzle plate, channel plate, reserver plate, restrictor plate, chamber plate and vibration plate are formed by coating the above material where electrolytic plating process and nonelectrolytic plating process may be used for the coating method.

Substrate is removed after completing the whole structure by forming the vibration plate. Photoresist is removed by etching after removing the substrate. Crater, nozzle, channel, reserver, restrictor, and chamber are formed by removing the photoresistor contained in whole structure.

The above process may be performed in reverse order. Individual processes in case of this reverse sequence processing are same for each as described above; whence vibration plate, chamber plate, restrictor plate, reserver plate, channel plate, nozzle plate and crater layer are sequentially formed under substrate which is removed thereafter and then substance is etched to remove photoresist.

Ink jet printer head is completed either by forming piezoelectric/electrostrictive film actuator and upper electrode or by forming lower electrode, piezoelectric/electrostrictive film and upper electrode upon vibration plate formed by either of the methods explained above. Generally used methods may be used in forming the actuator.

Substrate may be lapped, patterned and etched so as to be used as piezoelectric/electrostrictive film after whole structure is completed in case where piezoelectric/electrostrictive material of PZT etc. is used for substrate in the above reverse order method. Then ink jet printer head is completed by only forming the upper electrode in this case.

Because the present invention method as explained above molds the ink jet printer head in a bundle by electrochemical batch process, mass production of large area is facile, and lead time is reduced because there came no need of adfixing and assembling processes of each and all part materials as conventional.

And yield percentage of each part is enhanced, high precision array is feasible because arrangement error of molded structure substance is minimized, and rigidity and ink bearing characteristics of head parts such as hydrophilicity and water repellency may be controlled by properly selecting the composition elements of each part, which characteristics are required per position part respectively.

Now the present invention is explained again in detail referring to appended drawings.

Figure 2:
FIG. 2 through FIG. 26 represent flow diagrams showing an example of the present invention.
Figure 3:
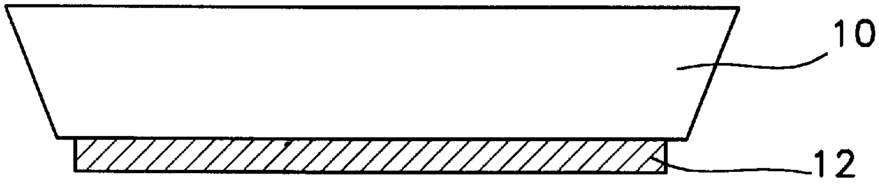
Figure 4:
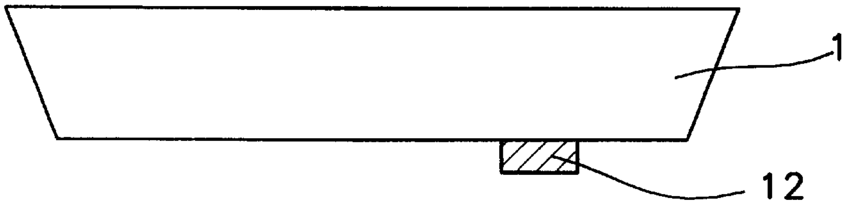
Figure 5:
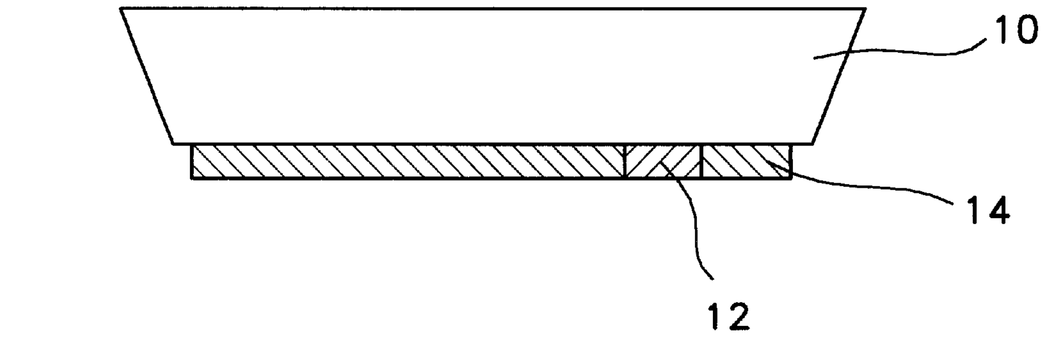
Figure 6:
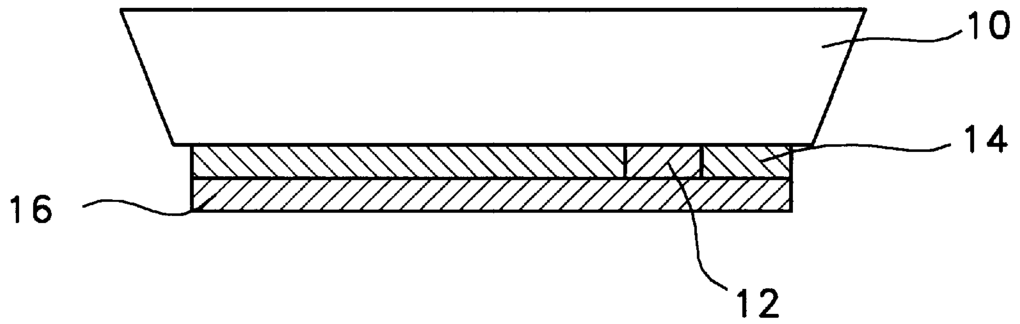
Figure 7:
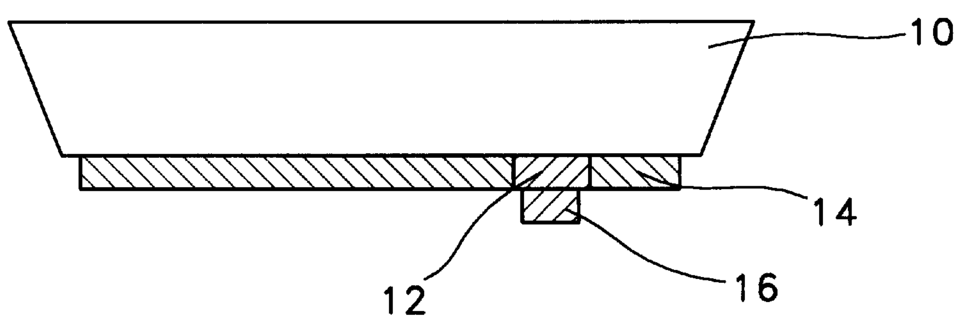
Figure 8:
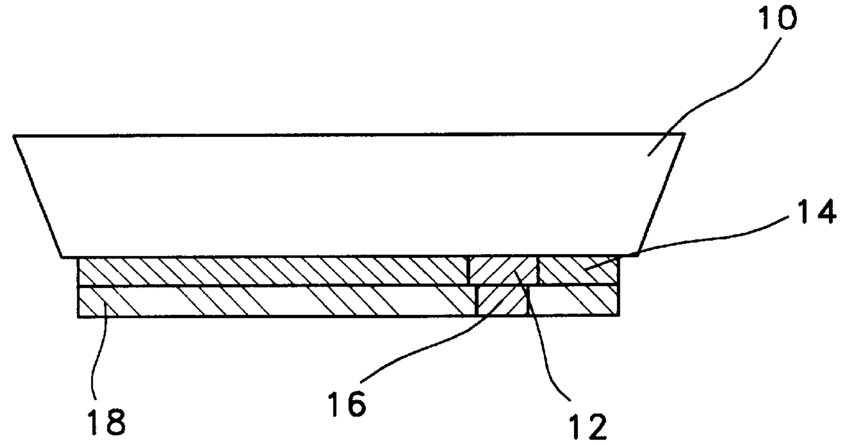
Figure 9:
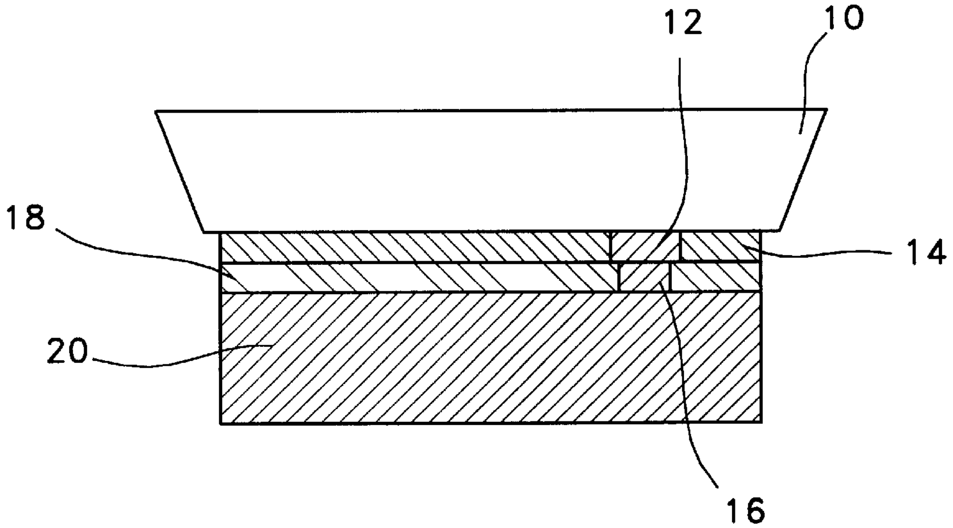
Figure 10:
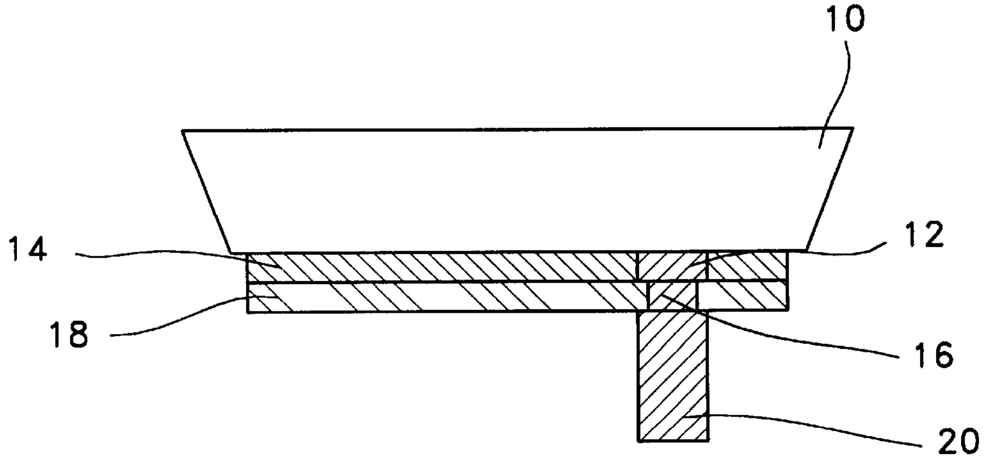
Figure 11:
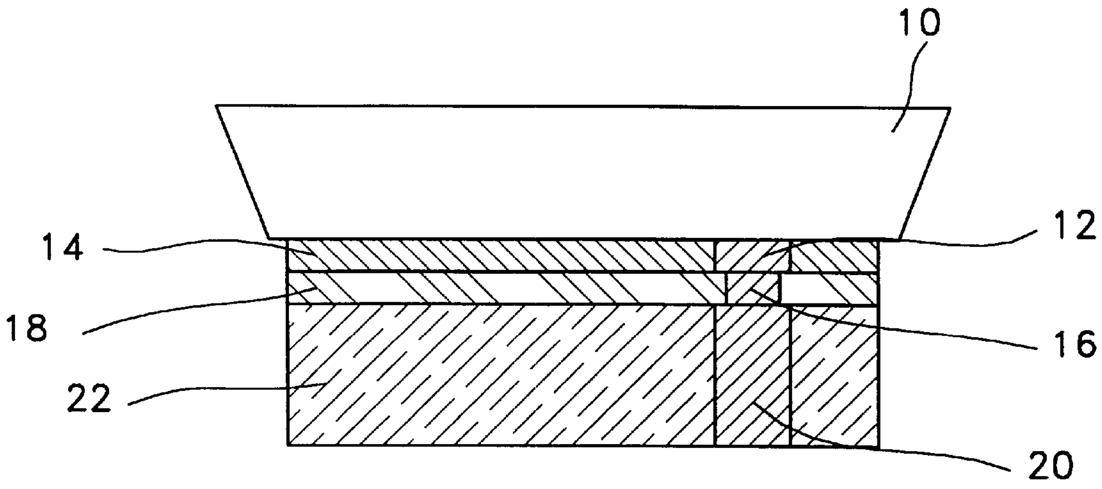
Figure 12:
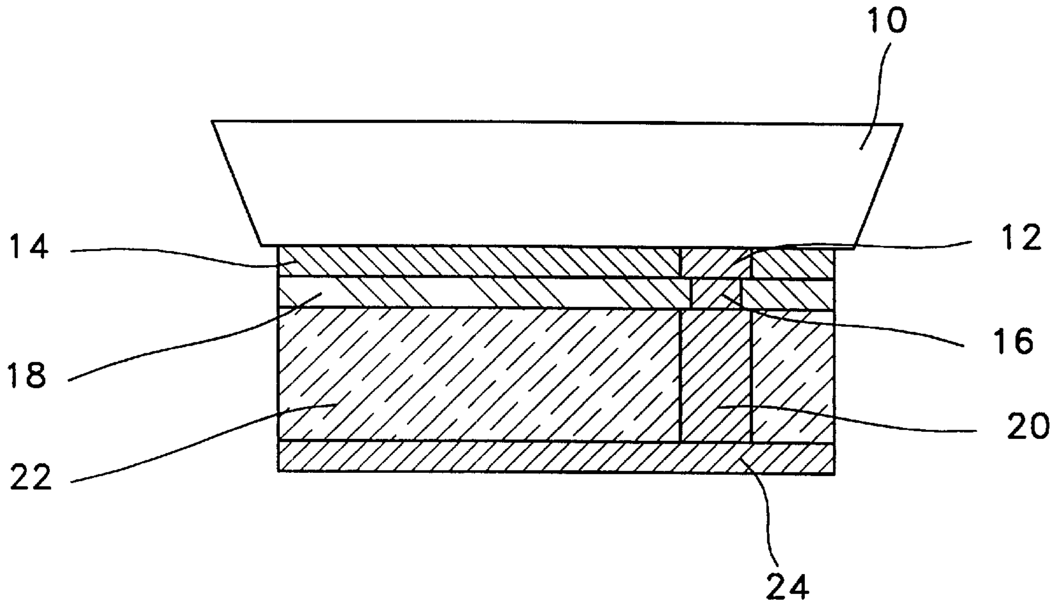
Figure 13:
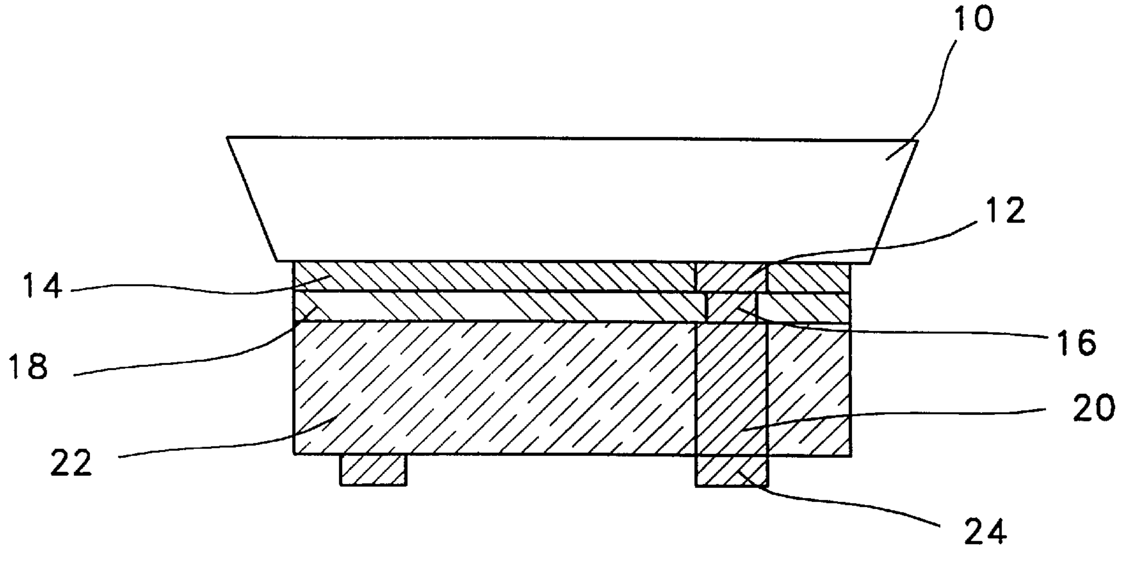
Figure 14:
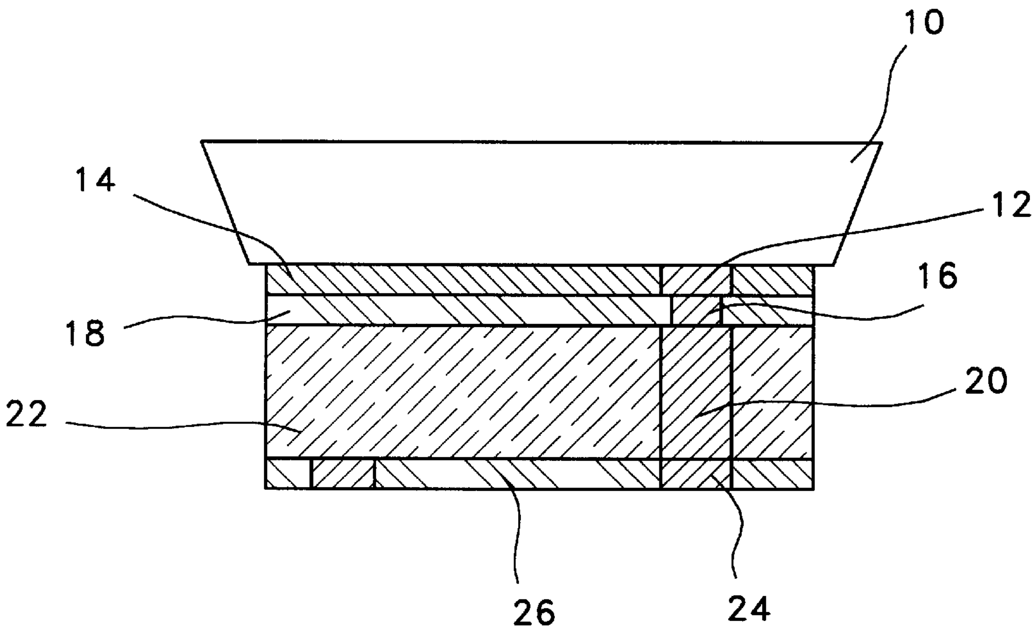
Figure 15:
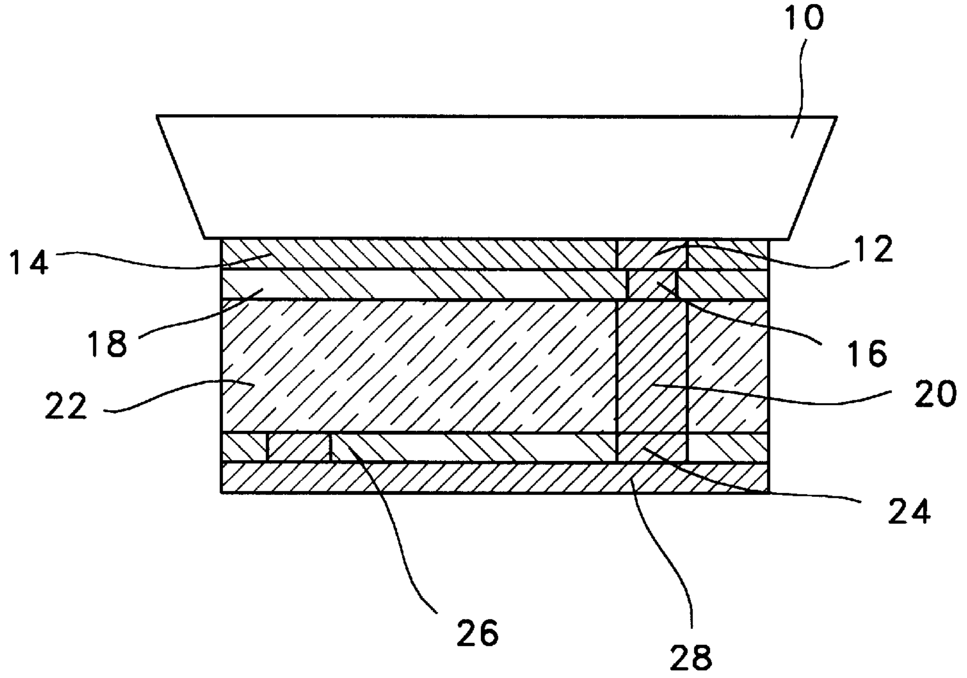
Figure 16:
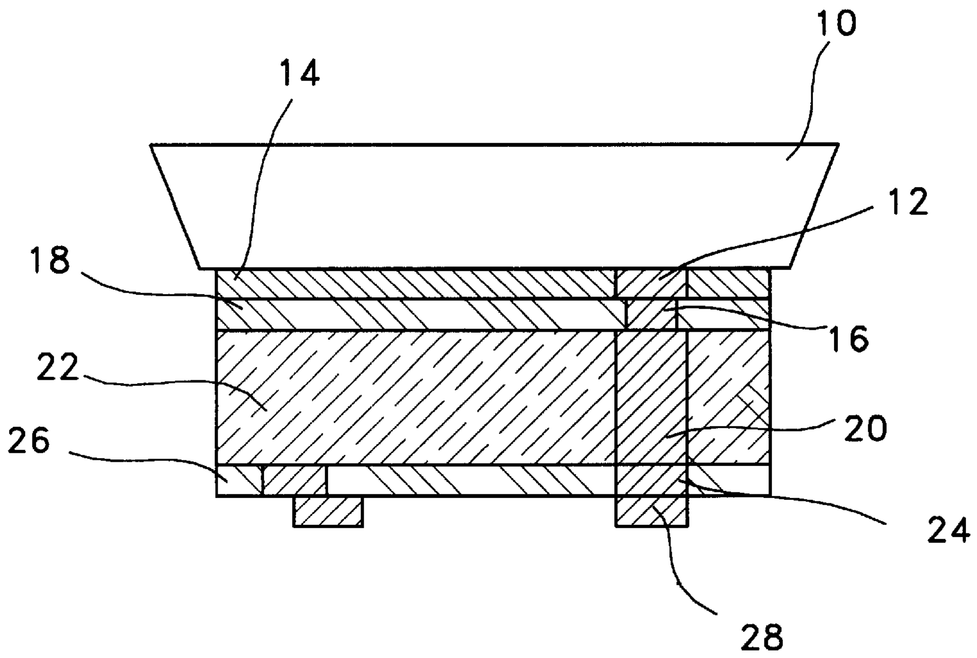
Figure 17:
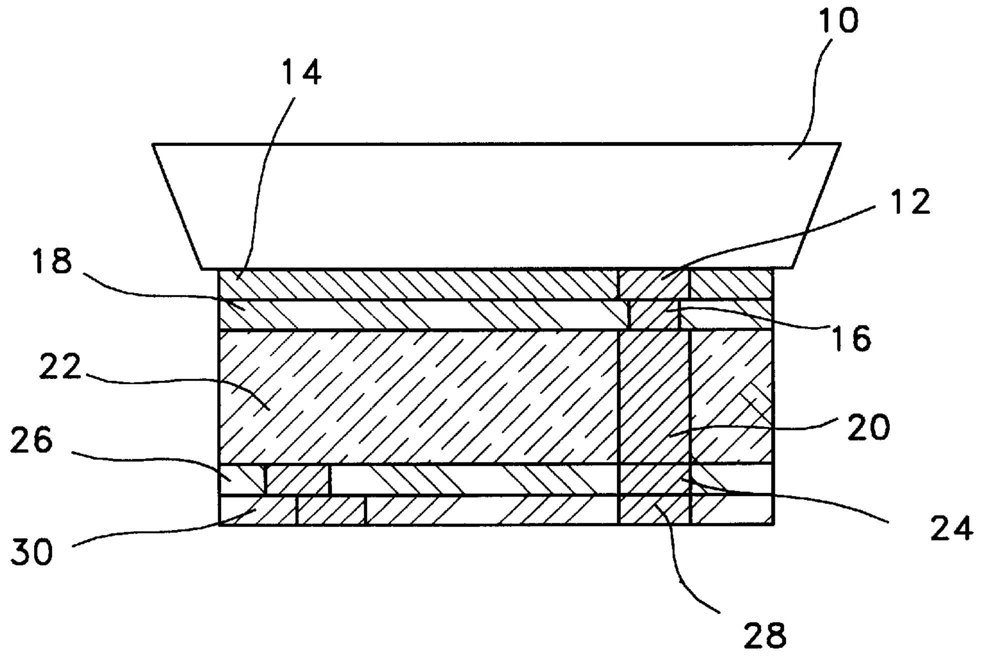
Figure 18:
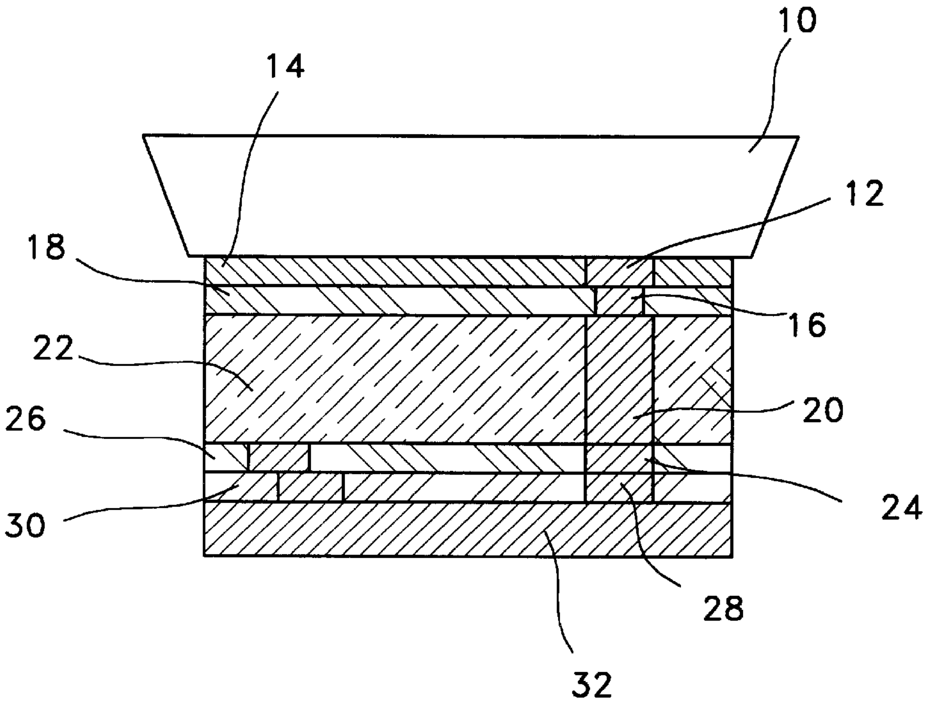
Figure 19:
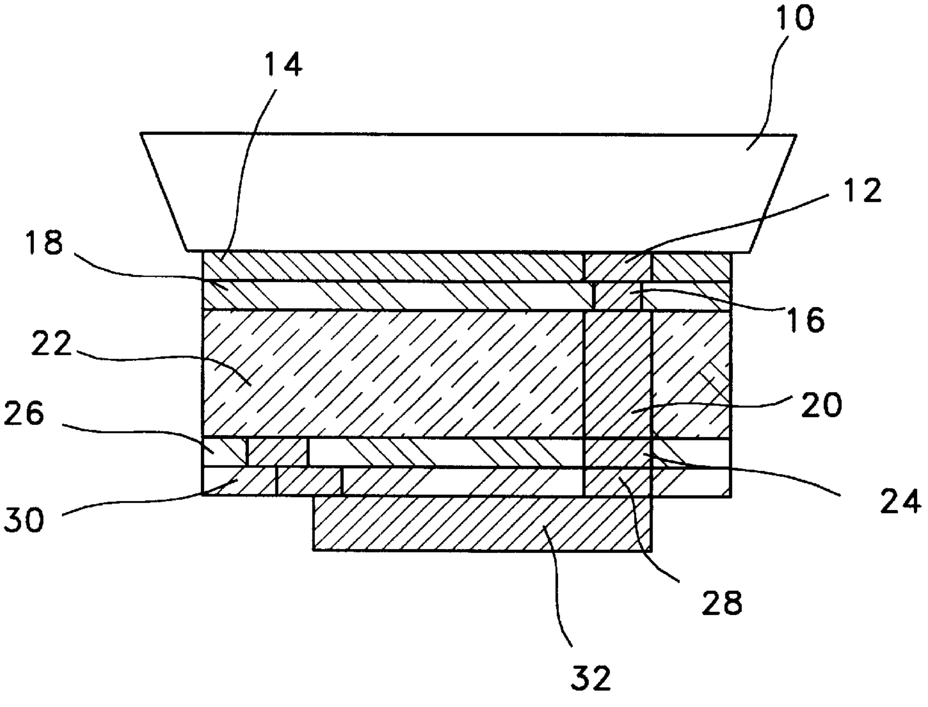
Figure 20:
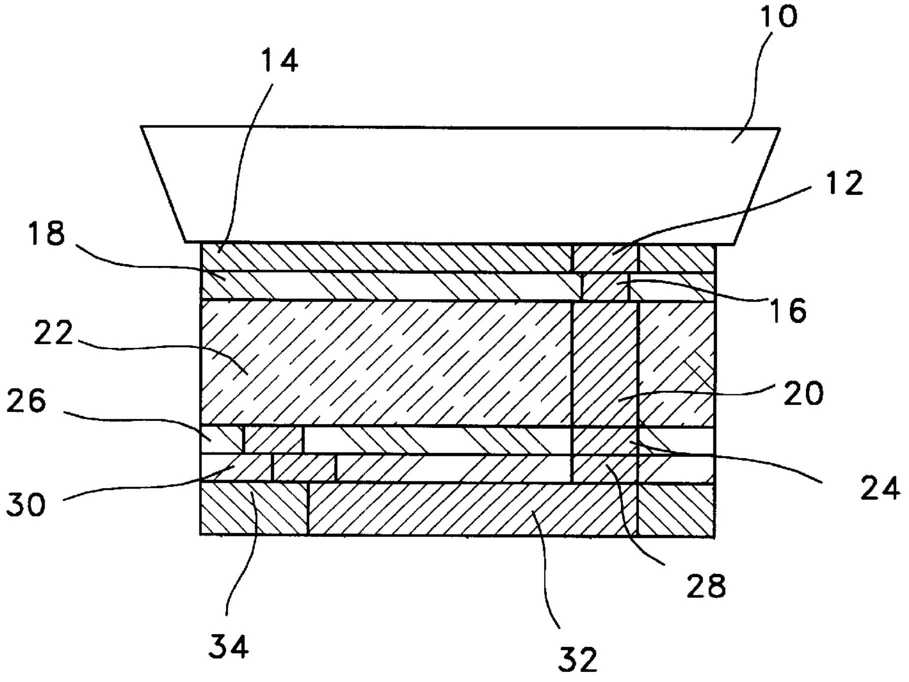
Figure 21:
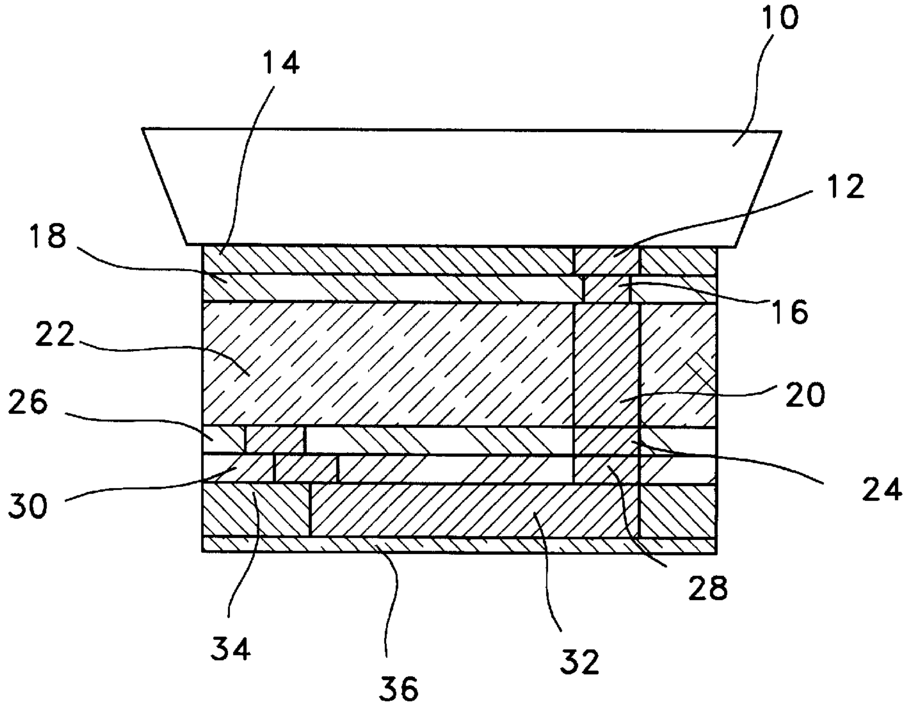
Figure 22:
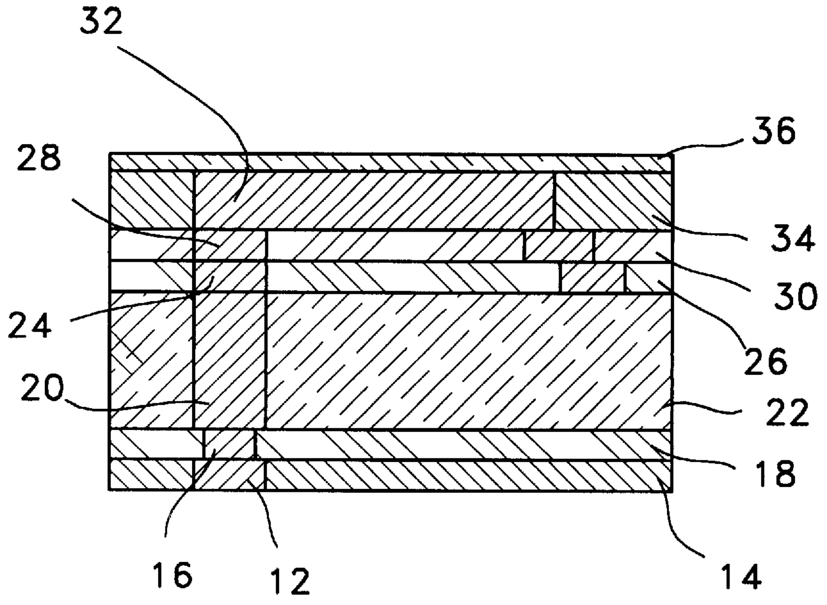
Figure 23:
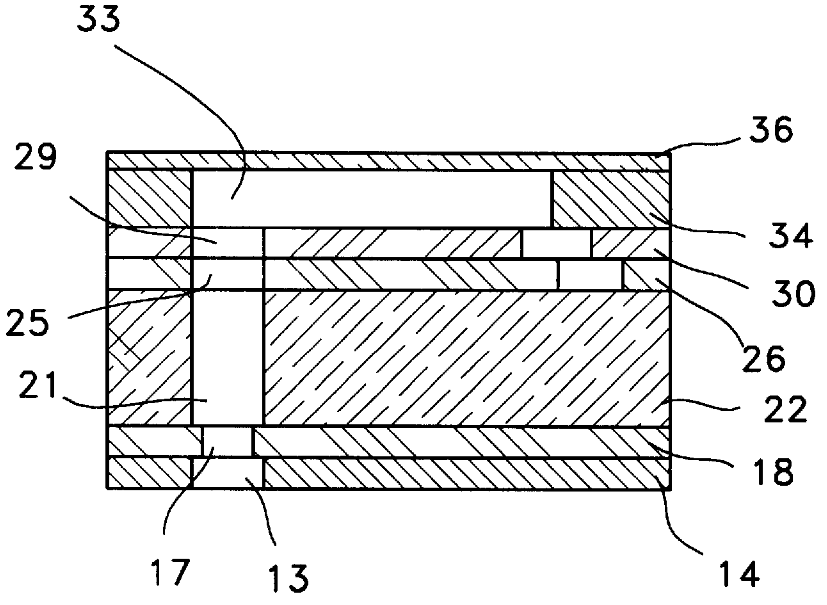
Figure 24:
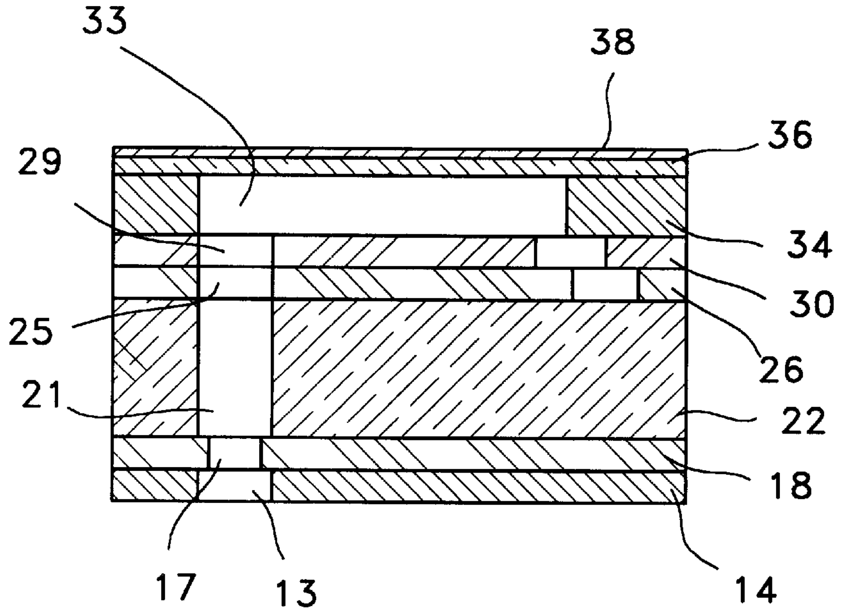
Figure 25:
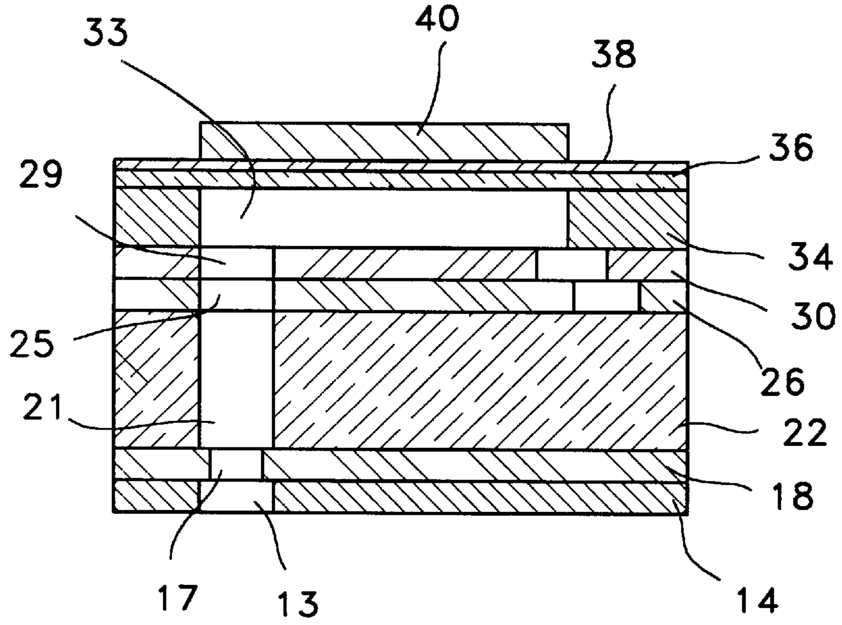
Figure 26:
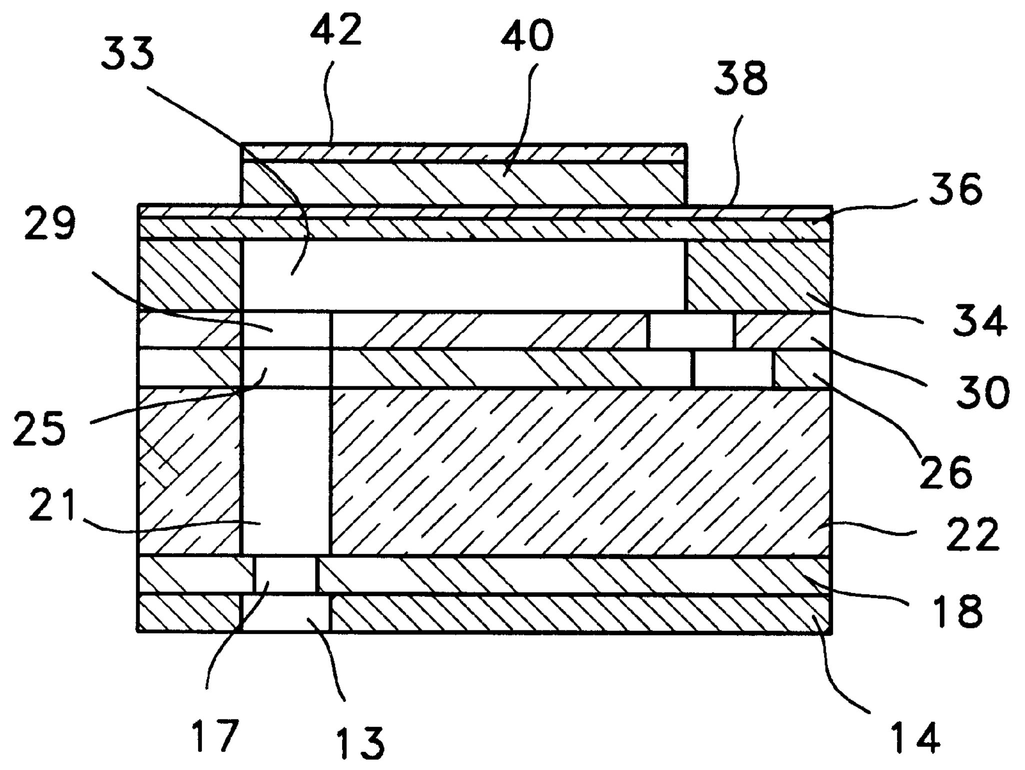

FIG. 2 through FIG. 26 show an example of methods of the present invention.

First photoresist 12 is coated by thickness of crater layer under substrate 10, then is exposed and etched and portion where crater is to be formed is shielded by first photoresister 12. Then crater layer 14 is formed under substrate.

Second photoresist 16 is coated by thickness of nozzle plate under formed crater layer 14, then is exposed and etched and portion where nozzle is to be formed is shielded by second photoresister 16. Then nozzle plate 18 is formed under crater layer 14.

Third photoresist 20 is coated by thickness of channel plate under formed nozzle plate 18, then is exposed and etched and portion where channel is to be formed is shielded by third photoresister 20. Then channel plate 22 is formed under nozzle plate 18 shielded by third photoresister 20.

Fourth photoresist 24 is coated by thickness of reserver plate under formed channel plate 22, then is exposed and etched and portion where reserver is to be formed is shielded by fourth photoresister 24. Then reserver plate 26 is formed under channel plate 22 shielded by fourth photoresister 24.

Fifth photoresist 28 is coated by thickness of restrictor plate under formed reserver plate 26, then is exposed and etched and portion where restrictor is to be formed is shielded by fifth photoresister 28. Then restrictor plate 30 is formed under reserver plate 26 shielded by fifth photoresister 28.

Sixth photoresist 32 is coated by thickness of chamber plate under formed restrictor plate 30, then is exposed and etched and portion where chamber is to be formed is shielded by sixth photoresister 32. Then chamber plate 34 is formed under restrictor plate 30 shielded by sixth photoresister 32.

Substrate 10 is removed after body structure completion by forming the vibration plate 36 under formed chamber plate 34. Photoresists 12, 16, 20, 24, 28 and 32 are removed by etching after substrate 10 removal. Crater 13, nozzle 17, channel 21, reserver 25, restrictor 29 and chamber 33 are formed if photoresist contained in whole structure has been removed so that ink jet printer head body will be completed.

Ink jet printer head is completed by forming lower electrode 38, piezoelectric/electrostrictive film 40 and upper electrode 42 upon vibration plate 36 in ink jet printer head.

Figure 27:
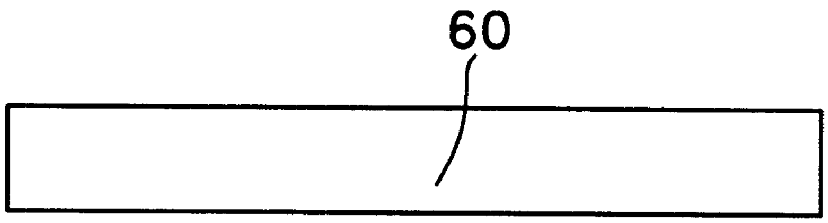
FIG. 27 through FIG. 50 represent flow diagrams showing another example of the present invention.
Figure 28:
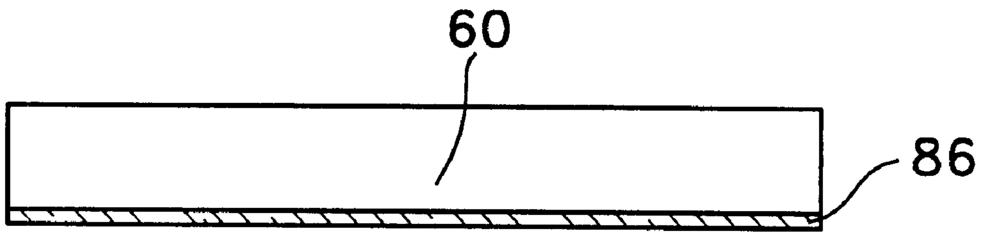
Figure 29:
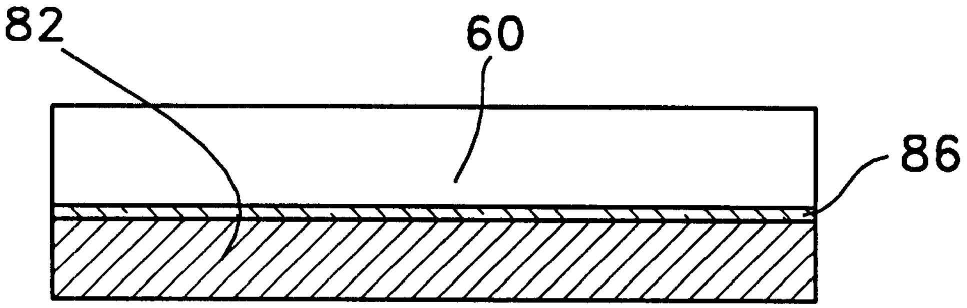
Figure 30:
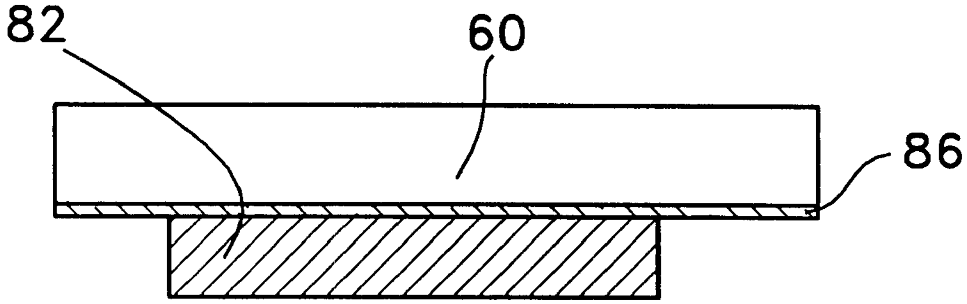
Figure 31:
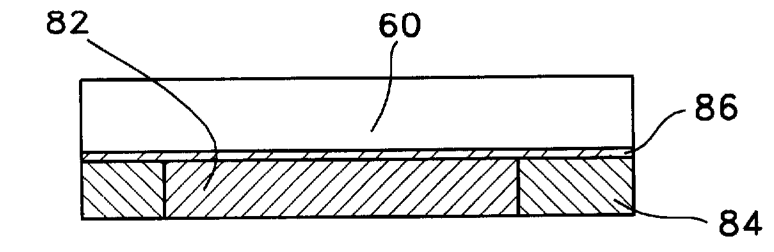
Figure 32:
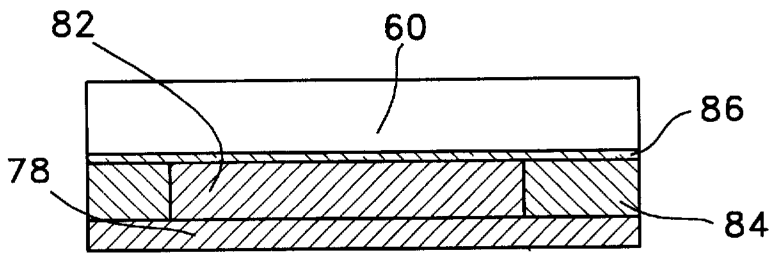
Figure 33:
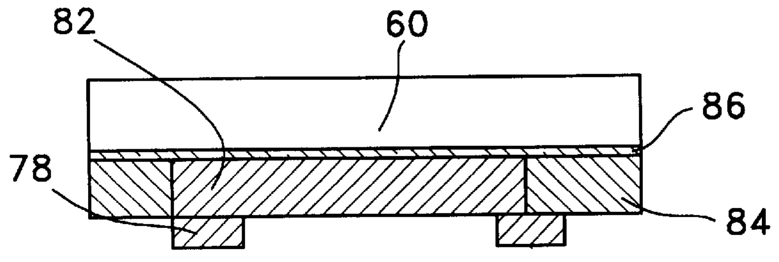
Figure 34:
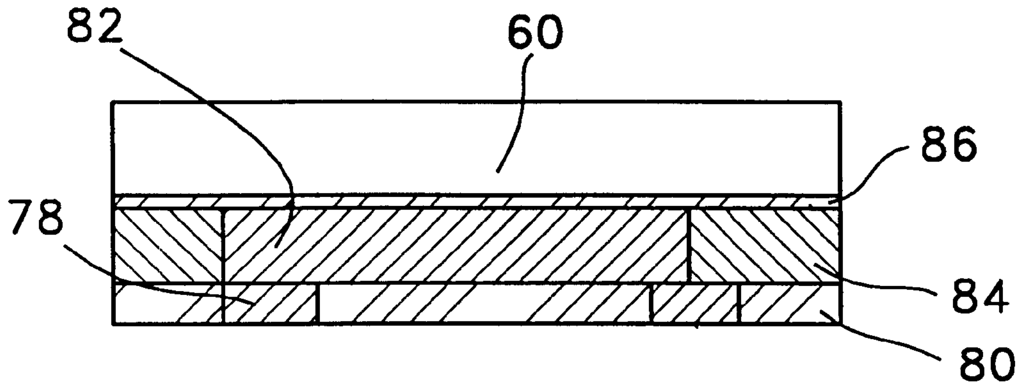
Figure 35:
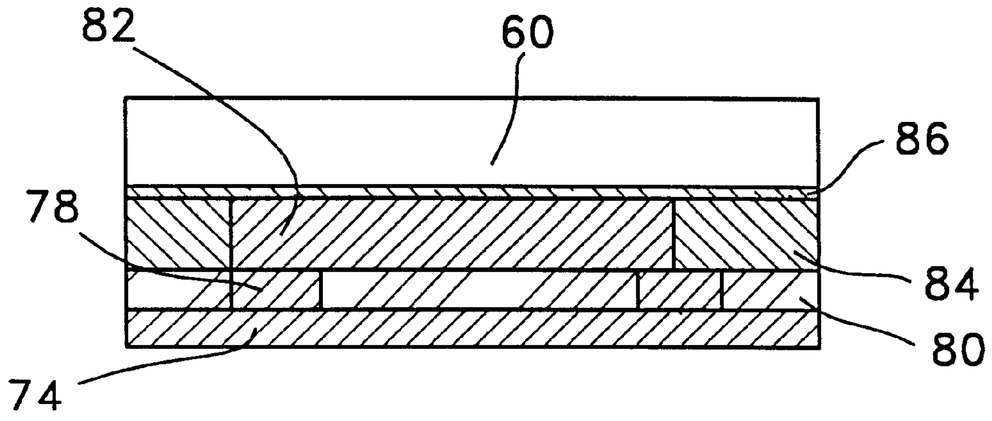
Figure 36:
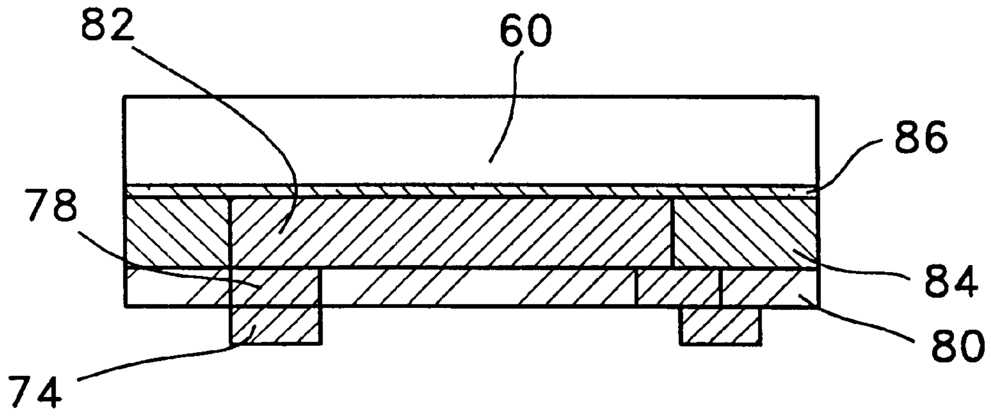
Figure 37:
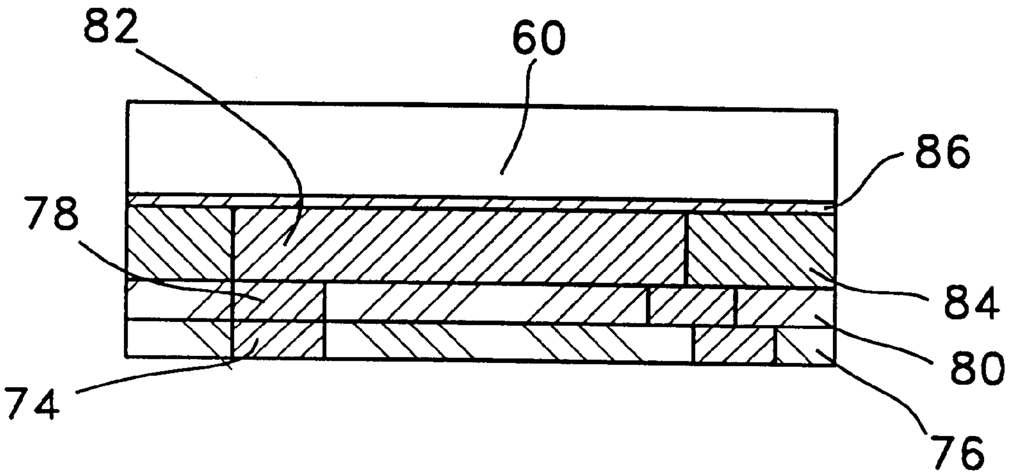
Figure 38:
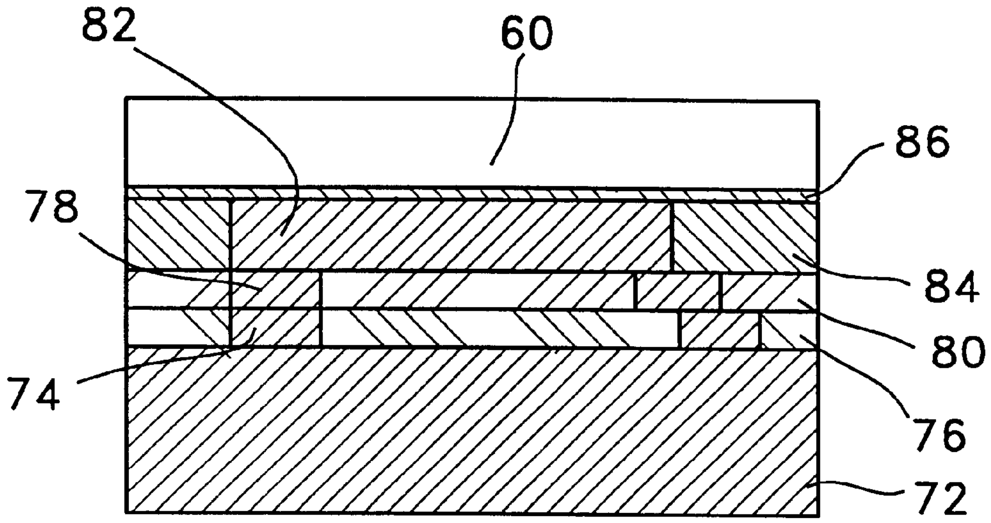
Figure 39:
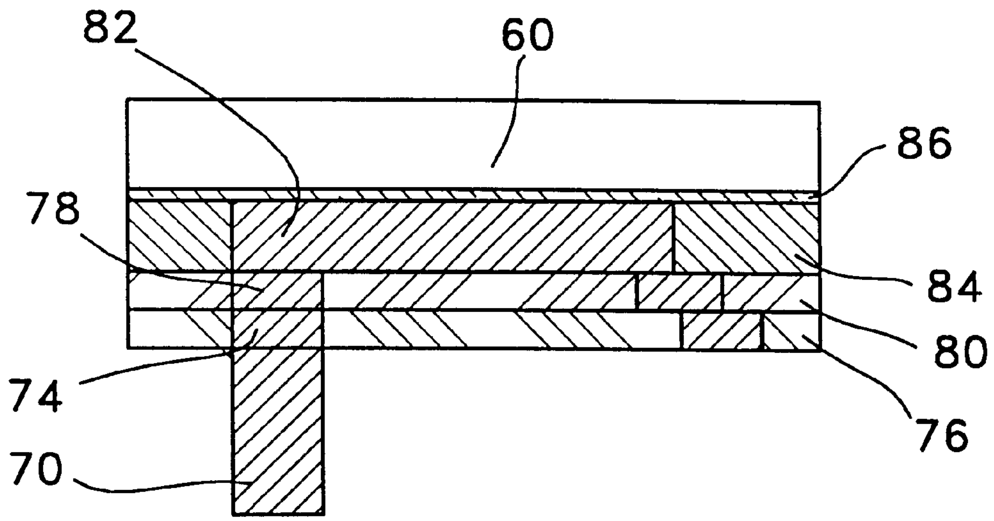
Figure 40:
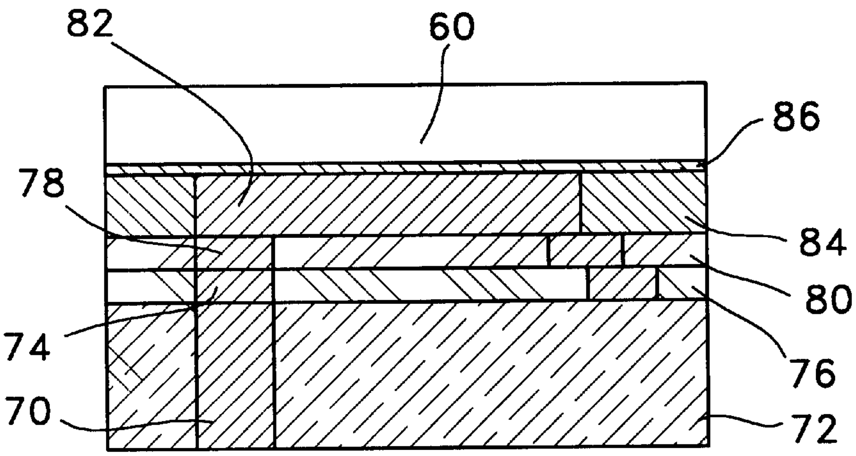
Figure 41:
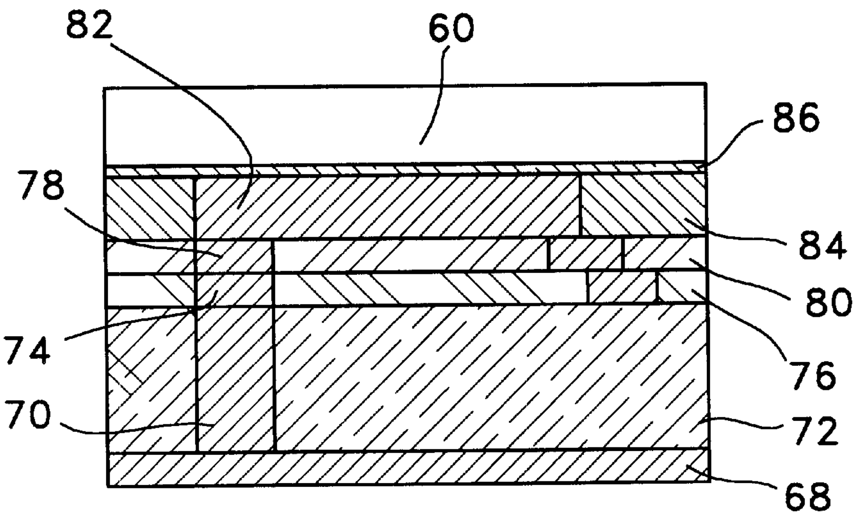
Figure 42:
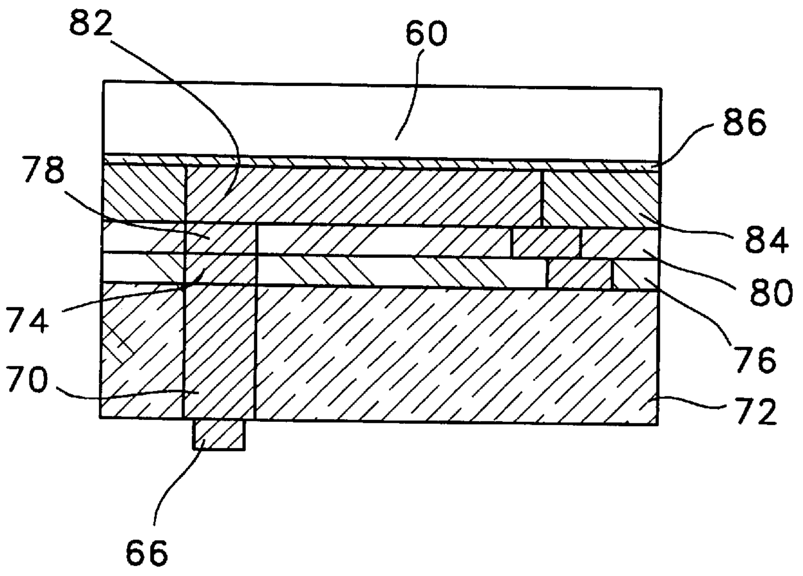
Figure 43:
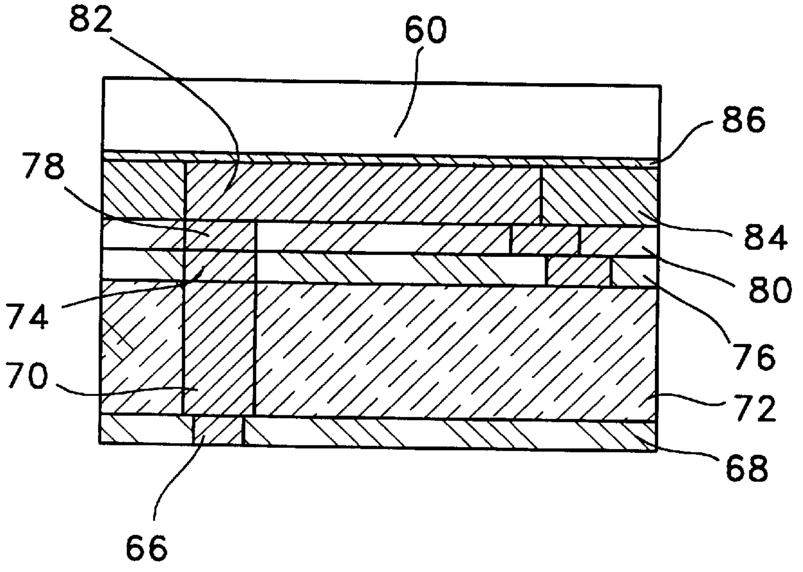
Figure 44:
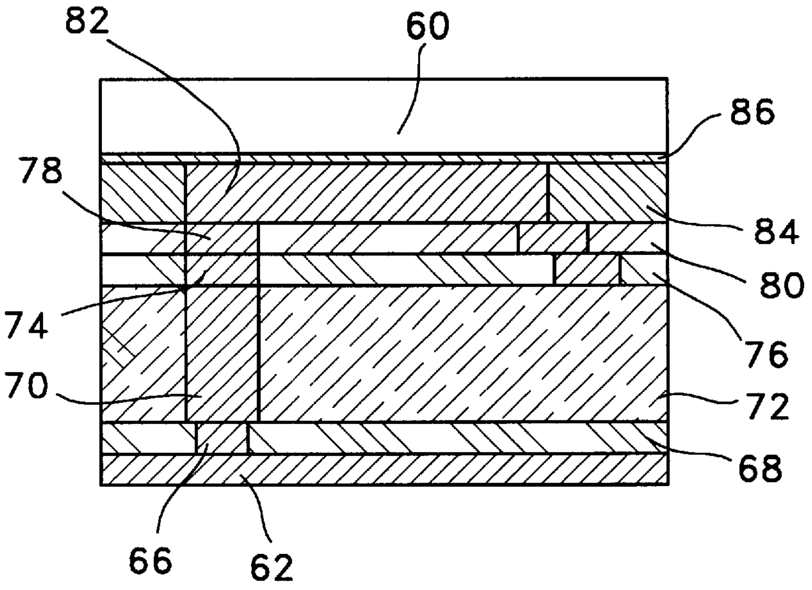
Figure 45:
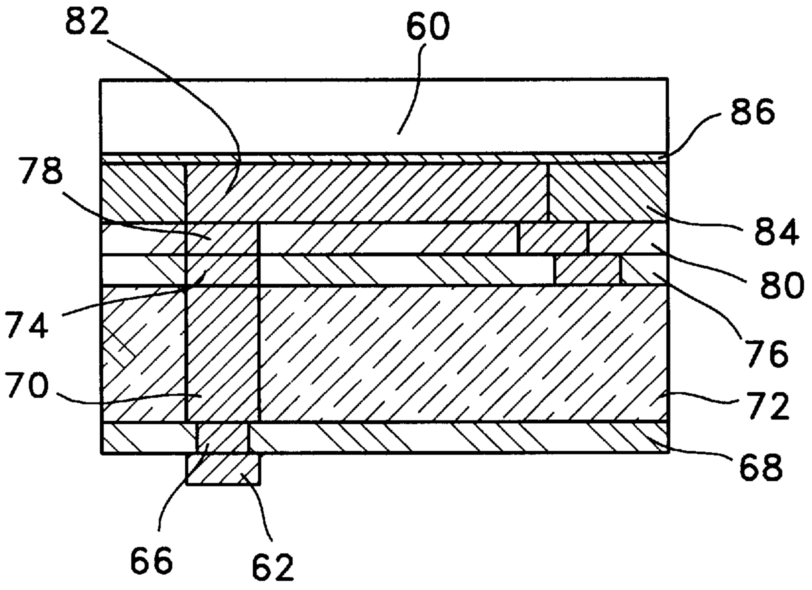
Figure 46:
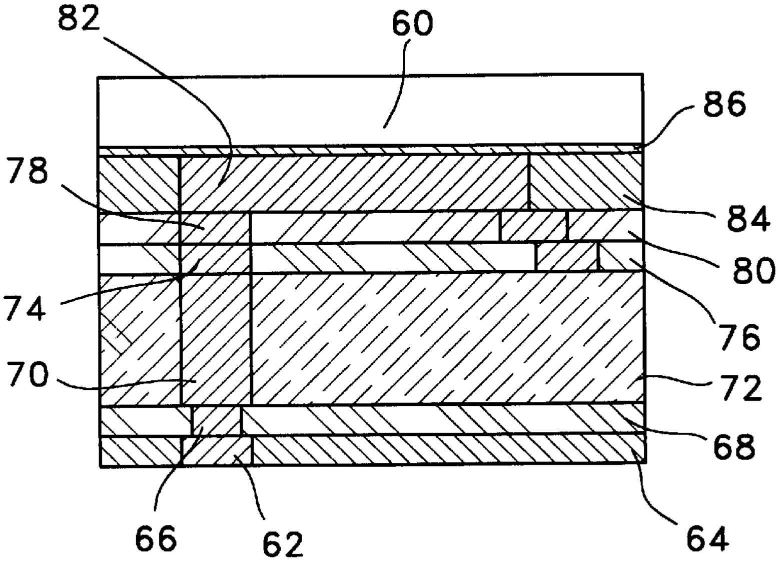
Figure 47:
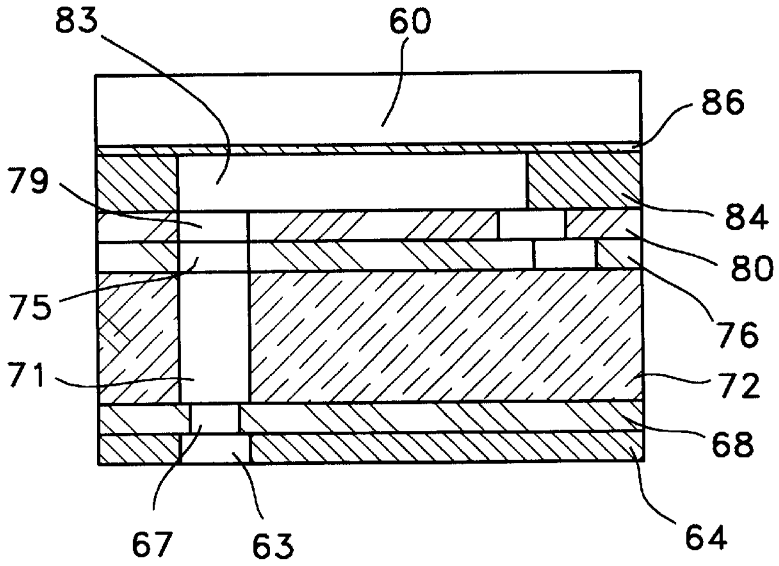
Figure 48:
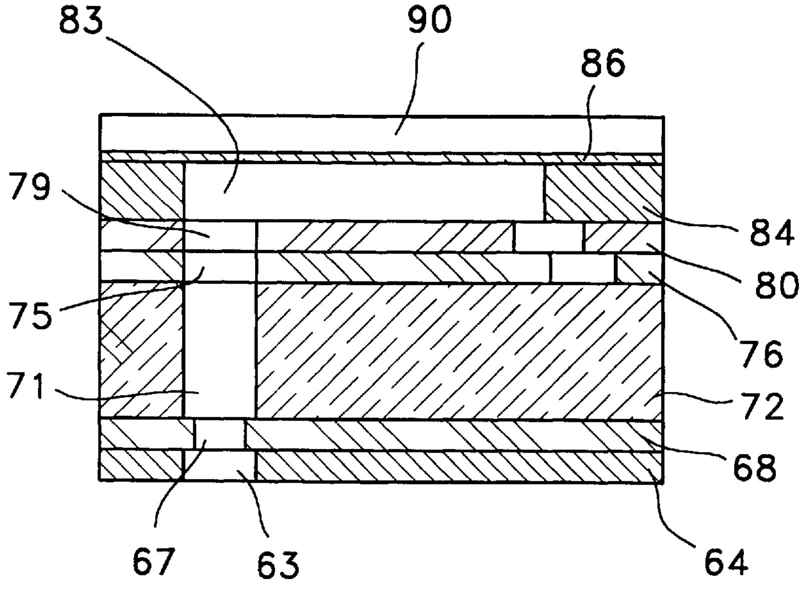
Figure 49:
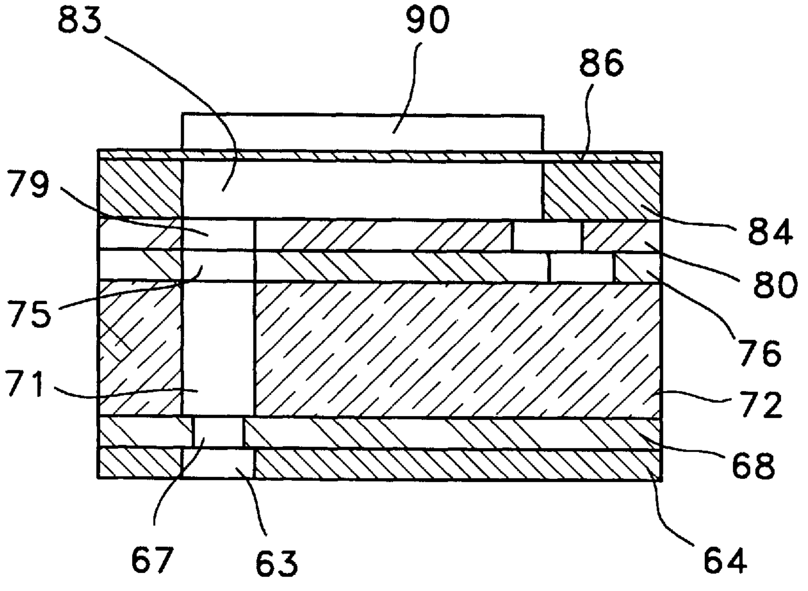
Figure 50:
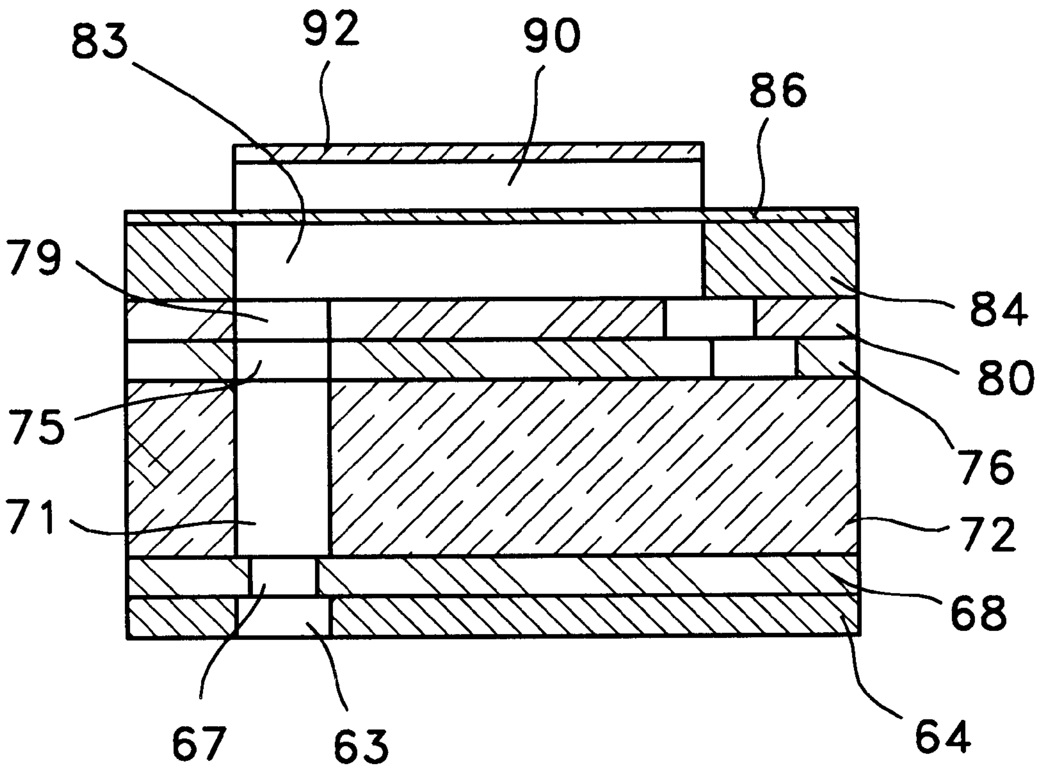

FIG. 27 through FIG. 50 show another example of methods of the present invention.

First vibration plate 86 is formed by plating under substrate 60 made of piezoelectric/electrostrictive material.

Sixth photoresist 82 is coated by thickness of chamber plate under formed vibration plate 60, then is exposed and etched and portion where chamber is to be formed is shielded by sixth photoresister 82. Then chamber plate 84 is formed under vibration plate 86 shielded by sixth photoresister 82.

Fifth photoresist 78 is coated by thickness of restrictor plate under formed chamber plate 84, then is exposed and etched and portion where restrictor is to be formed is shielded by fifth photoresister 78. Then restrictor plate 80 is formed under chamber plate 84 shielded by fifth photoresister 78.

Fourth photoresist 74 is coated by thickness of reserver plate under formed restrictor plate 80, then is exposed and etched and portion where reserver is to be formed is shielded by fourth photoresister 74. Then reserver plate 76 is formed under restrictor plate 80 shielded by fourth photoresister 74.

Third photoresist 70 is coated by thickness of channel plate under formed reserver plate 76, then is exposed and etched and portion where channel is to be formed is shielded by third photoresister 70. Then channel plate 72 is formed under reserver plate 76 shielded by third photoresister 70.

Second photoresist 66 is coated by thickness of nozzle plate under formed channel plate 72, then is exposed and etched and portion where nozzle is to be formed is shielded by second photoresister 66. Then nozzle plate 68 is formed under channel plate 72 shielded by second photoresister 66.

First photoresist 62 is coated by thickness of crater layer under formed nozzle plate 68, then is exposed and etched and portion where crater is to be formed is shielded by first photoresister 62. Then crater layer 64 is formed under nozzle plate 68 shielded by first photoresister 62.

Photoresists 62, 66, 70, 74, 78 and 82 are removed by etching after body structure completion by forming the crater layer 64. Crater 63, nozzle 67, channel 71, reserver 75, restrictor 79 and chamber 83 are formed if photoresists have been removed so that ink jet printer head body will be completed.

Piezoelectric/electrostrictive film 90 is formed by etching the substrate 60 after lapping to a definite thickness after completing the body structure. Ink jet printer head is completed by forming upper electrode 92 upon formed piezoelectric/electrostrictive film 90.

What is claimed is:

1. A manufacturing method of an ink jet printer head comprising steps of:

providing a substrate;

forming a first photoresist layer by coating photoresist in the thickness of a crater layer under said substrate;

leaving said first photoresist only at crater part by patterning, exposing to light and etching said first photoresist layer;

forming said crater layer under said substrate by plating process;

forming a second photoresist layer by coating photoresist in the thickness of a nozzle plate under said crater layer;

leaving said second photoresist only at nozzle part by patterning, exposing to light and etching said second photoresist layer;

forming said nozzle plate under said crater layer by plating process;

forming a third photoresist layer by coating photoresist in the thickness of a channel plate under said nozzle plate;

leaving said third photoresist only at channel part by patterning, exposing to light and etching said third photoresist layer;

forming said channel plate under said nozzle plate by plating process;

forming a fourth photoresist layer by coating photoresist in the thickness of a reserver plate under said channel plate;

leaving said fourth photoresist only at reserver part by patterning, exposing to light and etching said fourth photoresist layer;

forming said reserver plate under said channel plate by plating process;

forming a fifth photoresist layer by coating photoresist in the thickness of a restrictor plate under said reserver plate;

leaving said fifth photoresist only at restrictor part by patterning, exposing and etching said fifth photoresist layer;

forming said restrictor plate under said reserver plate by plating process;

forming a sixth photoresist layer by coating photoresist in the thickness of a chamber plate under said restrictor plate;

leaving said sixth photoresist only at chamber part by patterning, exposing and etching said sixth photoresist layer;

forming said chamber plate under said restrictor plate by plating process;

forming a vibration plate under said chamber plate by plating process;

removing said substrate;

removing all photoresist remaining;

forming a piezoelectric/electrostrictive film to actuate when electrified upon said vibration plate; and forming an upper electrode upon said piezoelectric/electrostrictive film.

2. The method in claim 1, further comprising a step of forming a lower electrode between said vibration plate and said piezoelectric/electrostrictive film.

3. The method in claim 1, further comprising a step of forming a seeding layer made of metal under the substrate in order that plating will take place in stable condition.

4. The method in claim 1, wherein material for said crater layer is single metal, complex metal, ceramic or metal-ceramic complex.

5. The method in claim 4, wherein said single metal is nickel (Ni) or copper (Cu).

6. The method in claim 4, wherein said complex metal is alloy such as nickel-chromium (Ni—Cr) or nickel-cobalt-tungsten (Ni—Co—W).

7. The method in claim 4, wherein said ceramic is silicon dioxide ($SiO_2$), silicon nitride ($Si_3N_4$), aluminium oxide ($Al_2O_3$) or silicon carbide (SiC).

8. The method in claim 4, wherein said metal-ceramic complex is nickel-ceramic mixture of nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

9. The method in claim 1, wherein material of said nozzle plate is single metal, complex metal, ceramic or metal-ceramic complex.

10. The method in claim 9, wherein said single metal is nickel (Ni) or copper (Cu).

11. The method in claim 9, wherein said complex metal is alloy such as nickel-chromium (Ni—Cr) or nickel-cobalt-tungsten (Ni—Co—W).

12. The method in claim 9, wherein said ceramic is silicon dioxide ($SiO_2$), silicon nitride ($Si_3N_4$), aluminium oxide ($Al_2O_3$) or silicon carbide (SiC).

13. The method in claim 9, wherein said metal-ceramic complex is nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

14. The method in claim 1, wherein said channel plate material is single metal, complex metal, ceramic or metal-ceramic complex.

15. The method in claim 14, wherein said single metal is nickel (Ni) or copper (Cu).

16. The method in claim 14, wherein said complex metal is alloy such as nickel-chromium (Ni—Cr) or nickel-cobalt-tungsten (Ni—Co—W).

17. The method in claim 14, wherein said ceramic is silicon dioxide ($SiO_2$), silicon nitride ($Si_3N_4$), aluminium oxide ($Al_2O_3$) or silicon carbide (SiC).

18. The method in claim 14, wherein said metal-ceramic complex is nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

19. The method in claim 1, wherein material of said reserver plate is single metal, complex metal, ceramic or metal-ceramic complex.

20. The method in claim 19, wherein said single metal is nickel (Ni) or copper (Cu).

21. The method in claim 19, wherein said complex metal is alloy such as nickel-chromium (Ni—Cr) or nickel-cobalt-tungsten (Ni—Co—W).

22. The method in claim 19, wherein said ceramic is silicon dioxide ($SiO_2$), silicon nitride ($Si_3N_4$), aluminium oxide ($Al_2O_3$) or silicon carbide (SiC).

23. The method in claim 19, wherein said metal-ceramic complex is nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

24. The method in claim 1, wherein material of said restrictor plate is single metal, complex metal, ceramic or metal-ceramic complex.

25. The method in claim 24, wherein said single metal is nickel (Ni) or copper (Cu).

26. The method in claim 24, wherein said complex metal is alloy such as nickel-chromium (Ni—Cr) or nickel-cobalt-tungsten (Ni—Co—W).

27. The method in claim 24, wherein said ceramic is silicon dioxide ($SiO_2$), silicon nitride ($Si_3N_4$), aluminium oxide ($Al_2O_3$) or silicon carbide (SiC).

28. The method in claim 24, wherein said metal-ceramic complex is nickel-aluminium oxide (Ni—$Al_2O_3$), nickel-silicon dioxide (Ni—$SiO_2$); nickel-titanium dioxide (Ni—$TiO_2$), nickel-silicon carbide (Ni—SiC), nickel-titanium carbide (Ni—TiC) or nickel-tungsten carbide (Ni—WC).

29. The method in claim 1, wherein material of said chamber plate is single metal, complex metal, ceramic or metal-ceramic complex.

30. The method in claim 29, wherein said single metal is nickel (Ni) or copper (Cu).

31. The method in claim 29, wherein said complex metal is alloy such as nickel-chromium (Ni—Cr) or nickel-cobalt-tungsten (Ni—Co—W).

32. The method in claim 29, wherein said ceramic is silicon dioxide ($SiO_2$), silicon nitride ($Si_3N_4$), aluminium oxide ($Al_2O_3$) or silicon carbide (SiC).

33. The method in claim 29, wherein said metal-ceramic complex is nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

34. The method in claim 1, wherein material of said vibration plate is single metal, complex metal, ceramic or metal-ceramic complex.

35. The method in claim 34, wherein said single metal is nickel (Ni) or copper (Cu).

36. The method in claim 34, wherein said complex metal is alloy such as nickel-chromium (Ni—Cr) or nickel-cobalt-tungsten (Ni—Co—W).

37. The method in claim 34, wherein said ceramic is silicon dioxide ($SiO_2$), silicon nitride ($Si_3N_4$), aluminium oxide ($Al_2O_3$) or silicon carbide (SiC).

38. The method in claim 34, wherein said metal-ceramic complex is nickel-aluminium oxide (Ni—$Al_2O_3$) nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

39. A manufacturing method of an ink jet printer head comprising steps of:

providing a substrate made of piezoelectric/electrostrictive material;

forming a vibration plate by plating under said substrate;

forming a sixth photoresist layer by coating photoresist in the thickness of a chamber plate under said vibration plate;

leaving said sixth photoresist only at chamber part by patterning, exposing and etching said sixth photoresist layer;

forming said chamber plate by plating under said vibration plate;

forming a fifth photoresist layer by coating photoresist in the thickness of a restrictor plate under said chamber plate;

leaving said fifth photoresist only at restrictor part by patterning, exposing and etching said fifth photoresist layer;

forming said restrictor plate by plating under said chamber plate;

forming a fourth photoresist layer by coating photoresist in the thickness of a reserver plate under said restrictor plate;

leaving said fourth photoresist only at reserver part by patterning, exposing to light and etching said fourth photoresist layer;

forming said reserver plate by plating under said restrictor plate;

forming a third photoresist layer by coating photoresist in the thickness of a channel plate under said reserver plate;

leaving said third photoresist only at channel part by patterning, exposing to light and etching said third photoresist layer;

forming said channel plate by plating under said reserver plate;

forming a second photoresist layer by coating photoresist in the thickness of a nozzle plate under said channel plate;

leaving said second photoresist only at nozzle part by patterning, exposing to light and etching said second photoresist layer;

forming said nozzle plate by plating under said channel plate;

forming a first photoresist layer by coating photoresist in the thickness of a crater layer under said nozzle plate;

leaving said first photoresist only at crater part by patterning, exposing to light and etching said first photoresist layer;

forming said crater layer by plating under said nozzle plate;

removing all photoresist remaining;

forming a piezoelectric/electrostrictive film by lapping, patterning and etching said substrate; and forming an upper electrode upon said piezoelectric/electrostrictive film.

40. The method in claim 39, further comprising a step of forming a lower electrode under said substrate.

41. The method in claim 39, further comprising a step of forming a seeding layer made of metal under said substrate in order that plating will take place in stable condition.

42. The method in claim 39, wherein material of said vibration plate is single metal, complex metal, ceramic or metal-ceramic complex.

43. The method in claim 42, wherein said single metal is nickel (Ni) or copper (Cu).

44. The method in claim 42, wherein said complex metal is alloy such as nickel-chromium (Ni—Cr) or nickel-cobalt-tungsten (Ni—Co—W).

45. The method in claim 42, wherein said ceramic is silicon dioxide ($SiO_2$), silicon nitride ($Si_3N_4$), aluminium oxide ($Al_2O_3$) or silicon carbide (SiC).

46. The method in claim 42, wherein said metal-ceramic complex is nickel-ceramic mixture of nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

47. The method in claim 39, wherein material of said chamber plate is single metal, complex metal, ceramic or metal-ceramic complex.

48. The method in claim 47, wherein said single metal is nickel (Ni) or copper (Cu).

49. The method in claim 47, wherein said complex metal is alloy such as nickel-chromium (Ni—Cr) or nickel-cobalt-tungsten (Ni—Co—W).

50. The method in claim 47, wherein said ceramic is silicon dioxide ($SiO_2$), silicon nitride ($Si_3N_4$), aluminium oxide ($Al_2O_3$) or silicon carbide (SiC).

51. The method in claim 47, wherein said metal-ceramic complex is nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

52. The method in claim 39, wherein material of said restricter plate is single metal, complex metal, ceramic or metal-ceramic complex.

53. The method in claim 52, wherein said single metal is nickel (Ni) or copper (Cu).

54. The method in claim 52, wherein said complex metal is alloy such as nickel-chromium (Ni—Cr) or nickel-cobalt-tungsten (Ni—Co—W).

55. The method in claim 52, wherein said ceramic is silicon dioxide ($SiO_2$), silicon nitride ($Si_3N_4$), aluminium oxide ($Al_2O_3$) or silicon carbide (SiC).

56. The method in claim 52, wherein said metal-ceramic complex is nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

57. The method in claim 39, wherein said reserver plate material is single metal, complex metal, ceramic or metal-ceramic complex.

58. The method in claim 57, wherein said single metal is nickel (Ni) or copper (Cu).

59. The method in claim 57, wherein said complex metal is alloy such as nickel-chromium (Ni—Cr) or nickel-cobalt-tungsten (Ni—Co—W).

60. The method in claim 57, wherein said ceramic is silicon dioxide ($SiO_2$), silicon nitride ($Si_3N_4$), aluminium oxide ($Al_2O_3$) or silicon carbide (SiC).

61. The method in claim 57, wherein said metal-ceramic complex is nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

62. The method in claim 39, wherein material of said channel plate is single metal, complex metal, ceramic or metal-ceramic complex.

63. The method in claim 62, wherein said single metal is nickel (Ni) or copper (Cu).

64. The method in claim 62, wherein said complex metal is alloy such as nickel-chromium (Ni—Cr) or nickel-cobalt-tungsten (Ni—Co—W).

65. The method in claim 62, wherein said ceramic is silicon dioxide ($SiO_2$), silicon nitride ($Si_3N_4$), aluminium oxide ($Al_2O_3$) or silicon carbide (SiC).

66. The method in claim 62, wherein said metal-ceramic complex is nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

67. The method in claim 39, wherein material of said nozzle plate material is single metal, complex metal, ceramic or metal-ceramic complex.

68. The method in claim 67, wherein said single metal is nickel (Ni) or copper (Cu).

69. The method in claim 67, wherein said complex metal is alloy such as nickel-chromium (Ni—Cr) or nickel-cobalt-tungsten (Ni—Co—W).

70. The method in claim 67, wherein said ceramic is silicon dioxide ($SiO_2$), silicon nitride ($Si_3N_4$), aluminium oxide ($Al_2O_3$) or silicon carbide (SiC).

71. The method in claim 67, wherein said metal-ceramic complex is nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

72. The method in claim 39, wherein material of said crater layer material is single metal, complex metal, ceramic or metal-ceramic complex.

73. The method in claim 72, wherein said single metal is nickel (Ni) or copper (Cu).

74. The method in claim 72, wherein said complex metal is alloy such as nickel-chromium (Ni—Cr) or nickel-cobalt-tungsten (Ni—Co—W).

75. The method in claim 72, wherein said ceramic is silicon dioxide ($SiO_2$), silicon nitride ($Si_3N_4$), aluminium oxide ($Al_2O_3$) or silicon carbide (SiC).

76. The method in claim 72, wherein said metal-ceramic complex is nickel-aluminium oxide (Ni—$Al_2O_3$), nickel-silicon dioxide (Ni—$SiO_2$), nickel-titanium dioxide (Ni—$TiO_2$), nickel-silicon carbide (Ni—SiC), nickel-titanium carbide (Ni—TiC) or nickel-tungsten carbide (Ni—WC).

* * * * *